United States Patent [19]

Brown

[11] Patent Number: 5,510,162
[45] Date of Patent: Apr. 23, 1996

[54] APPARATUS FOR PERFORMING A METHOD OF ALIGNING AND COUPLING A PAIR OF STEREOSCOPIC PRINTS

[76] Inventor: Dennis L. Brown, 328 Stow Rd., Harvard, Mass. 01451-1909

[21] Appl. No.: 283,408

[22] Filed: Aug. 1, 1994

[51] Int. Cl.$^6$ .................................................. G02B 27/22
[52] U.S. Cl. .................... 428/40; 359/473; 359/476; 359/477; 359/817; 428/13; 428/194; 428/201; 428/202; 428/913.3
[58] Field of Search ............................. 428/40, 194, 13, 428/913.3, 201, 202; 359/473, 476, 477, 817

[56] References Cited

U.S. PATENT DOCUMENTS 4,789,220  12/1988  Kinnard ........................... 359/473

*Primary Examiner*—Nasser Ahmad

[57] ABSTRACT

An apparatus and method for properly aligning, coupling and cropping two stereoscopically complementary pictures which are positioned one above the other. Alignment and holding apparatus includes a base for supporting two stereoscopically complementary pictures, a detachable joining strip with two areas of pressure sensitive adhesive for joining two pictures which is placed in a fixed planar shield with a pair of opposed guide flaps with one non stick surface for holding the joining strip, and a flat, flexible, transparent alignment sheet with grid markings which overlays the pictures and includes cut out areas for manually accessing the pictures for adjusting one picture relative to the other. A cropping apparatus includes a guide strip fixed to the supporting base at two ends with a middle section spaced away from the surface to allow a picture to be slid between the guide strip and the supporting base, and a cutting blade guide groove in the supporting surface for guiding an edged blade in cropping the pictures. A detachable cutting blade holder includes a cutting blade and a notch to engage the guide strip. A method of operation where pictures are placed, aligned and then coupled by the application of downward pressure on the top of the apparatus.

15 Claims, 4 Drawing Sheets

APPARATUS FOR PERFORMING A METHOD OF ALIGNING AND COUPLING A PAIR OF STEREOSCOPIC PRINTS

BACKGROUND OF THE INVENTION

The present invention is generally directed to an apparatus to aid an operator in performing the function of properly aligning a pair of stereoscopic prints and providing a means of holding the prints in permanent alignment. The invention also provides a print cropping function which is used to crop the individual prints separately or as a unit.

The recent development and marketing of an easy to use stereoscope for viewing standard sized prints (4 inch by 6 inch) obtained from modern 35 mm cameras has made it practical for amateur and professional photographers to easily produce stereoscopic images. These images are produced by sequentially exposing two pictures with one camera with the camera displaced to the side for the second exposure, or exposing two side by side cameras to the scene at the same instant. When the film is processed, two distinct photographs are generated that make up a stereo pair which must then be aligned and joined to create a single stereogram.

The new stereoscope requires the stereo pair of prints to be presented in an "over and under" alignment in which both prints are in a single plane and one print is arranged so that its lower edge is above the upper edge of he other print. However, it is a tedious task to properly align the images in the prints for viewing. As a result, stereo print pairs are either never permanently aligned or are aligned improperly. This makes stereoscopic viewing very difficult and results in considerable eye strain.

The most common method of holding the stereoscopic print pair in alignment consists of permanently attaching, with adhesive, each print separately to a backing sheet, usually paper or cardboard, which extends beyond the borders of the prints. This method is cumbersome because it requires great skill to attach the prints in proper alignment before the adhesive grabs the back of the print and makes further positioning adjustments difficult. It is also cumbersome in that once the two prints are attached to the backing sheet it becomes difficult to crop the edges of the prints in an operation known as "setting the stereo window" (the apparent depth plane created by the left and right edges of the prints) without scarring the backing sheet or exposing the adhesive.

The principle object of the invention is to provide an apparatus kit for enabling an operator to more easily align and hold images of two photographic prints together to form a stereo pair.

A further object of the present invention is the provision of an apparatus kit for cropping the edges of the individual prints for aesthetic reasons or to limit the print to the maximum size that the alignment apparatus can accommodate.

Another object of the present invention is to provide an apparatus kit for enabling an operator to more easily align images of two photographic prints to form a stereo pair by positioning one photograph above the other.

It is another object of this invention to provide an apparatus kit for enabling an operator to more easily align images of two photographic prints to form a stereo pair with a fixed vertical distance between the images.

A further object of this invention is to provide an apparatus kit for enabling an operator to more easily align images of two photographic prints to form a stereo pair with no rotation between the images.

Another object of this invention is to provide an apparatus kit for enabling an operator to more easily align images of two photographic prints to form a stereo pair such that the stereo window can be specified.

Another object of this invention is the provision of an apparatus kit for enabling an operator to more easily join the two prints together permanently so that they become an integral unit in a flat plane.

A further object of the present invention is the provision of an apparatus kit for enabling an operator to more easily crop the edges of the stereo pair for aesthetic reasons or to create a desired stereo window.

A still further object of the invention is to provide an apparatus kit for enabling an operator to more easily align images of two photographic prints to form a stereo pair by positioning one photograph above the other which is light in weight and compact to facilitate taking the apparatus on vacation travel trips where it may be used in conjunction with quick photo developing methods.

A further object of the invention is the provision of an apparatus kit for enabling an operator to more easily align images of two photographic prints to form a stereo pair by positioning one photograph above the other which is simple in construction, easy to manufacture and relatively inexpensive.

Another object of the invention is to provide an apparatus to permanently join two prints together which is simple in construction, easy to manufacture and inexpensive.

It is a further object of the invention to provide an apparatus for enabling an operator to easily align images of pairs of pictures for stereoscopic viewing which are generated by "conceptual" cameras such as with artwork which is produced by artists and designers and computers.

With these and other objects in view, as will be apparent to those skilled in the art, the invention resides in the combination of parts set forth in the specification and covered by the claims appended hereto.

SUMMARY OF THE INVENTION

In general, the invention consists of an apparatus kit for aligning and holding and cropping the edges of two stereoscopically complementary pictures which are positioned one above the other. In the preferred embodiment, the alignment and holding apparatus comprises a supporting base with an upper surface for supporting two stereoscopically complementary pictures, a detachable joining strip comprising a flat supporting substrate with two areas of pressure sensitive adhesive for permanently joining two stereoscopically complementary pictures, a fixed planar shield with a pair of opposed guide flaps with one non stick surface for holding the joining strip to the supporting surface, and a flat, flexible, transparent alignment sheet with one freely extending edge comprising alignment grid markings which overlays the stereoscopically complementary pictures and comprising cut out areas for manually accessing the stereoscopically complementary pictures for the purpose of adjusting one picture relative to the other. Alignment sheet markings comprise markings for aligning images in two pictures to a set vertical spacing and no rotation between the images, and markings for identifying and setting the stereo window by proper cropping of the edges of the pictures. A cropping apparatus comprises a guide board fixed to the supporting base at a right angle to a guide strip fixed to the supporting surface at two ends comprising a middle section spaced away from the surface to allow a picture to be slid between the guide strip and the supporting surface, and a cutting blade guide groove in the supporting surface placed in line with one edge of the guide strip for guiding an edged blade for the purpose of cropping the pictures. A detachable single edged blade safety holder comprises a single edged blade sandwiched between two ridged supporting plates which are permanently fixed at one end and attached at the blade end with a spring clip to allow the blade to be easily adjusted or changed.

Many other configurations are possible which include the use of various materials and construction methods.

BRIEF DESCRIPTION OF THE DRAWINGS

The character of the invention, however, may be best understood by reference to one of its structural forms, as. illustrated by the accompanying drawings, in which.

DESCRIPTION OF THE PREFERRED EMBODIMENT

Figure 1:
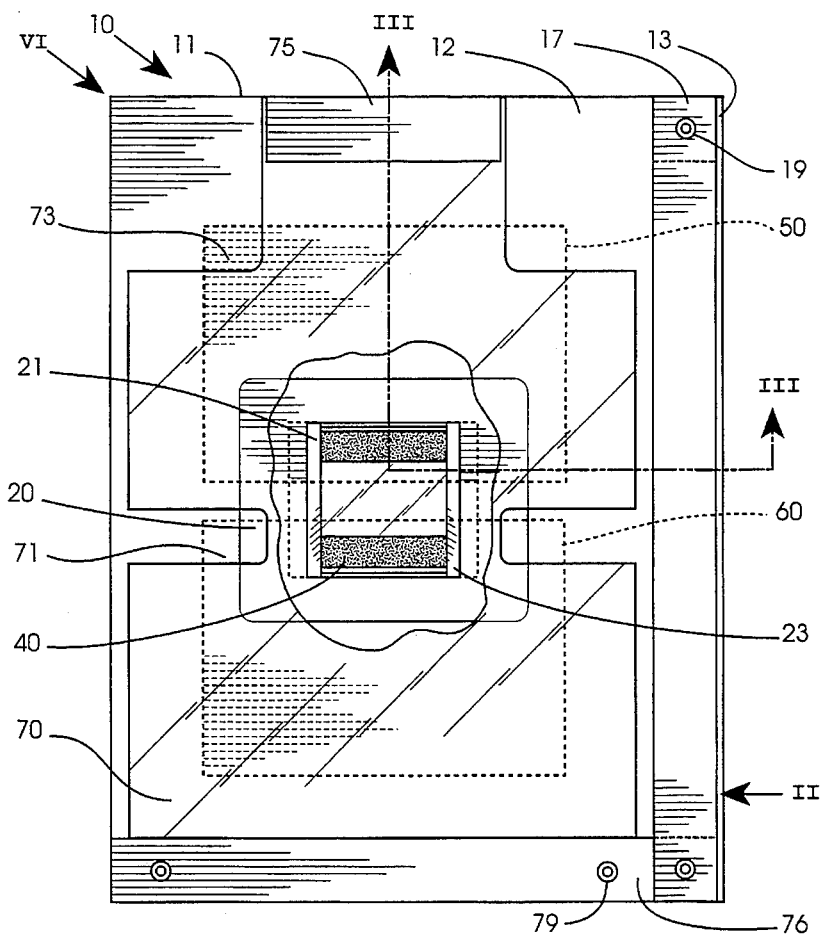
FIG. 1 is a top plan view of an alignment apparatus embodying the principles of the present invention.

Referring to FIGS. 1 to 12, an apparatus embodying the principles of the present invention for aligning and coupling a complementary pair of stereoscopic pictures for optimum viewing with a stereoscopic viewing device, is generally indicated by the reference numeral 10. The alignment apparatus comprises a rigid supporting base 11 which has a substantially flat upper supporting surface 12. The upper surface 12 supports a means of coupling a pair of pictures comprising a joining strip 40 which is loosely aligned to the surface 12 by a fixed planar shield 20 which surrounds the joining strip 40 and is removably captured to the surface by a pair of opposed flaps 21 and 23 which are fixed at one end to the shield 20.

Figure 3:
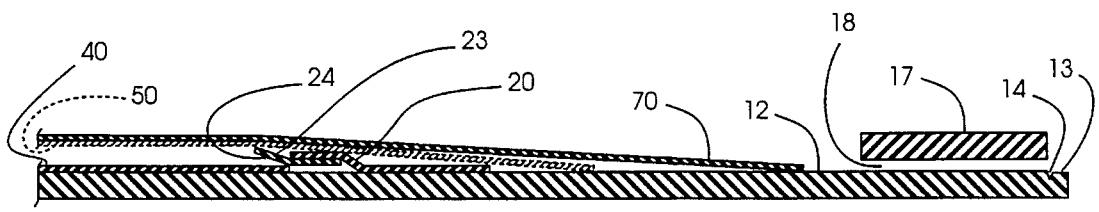
FIG. 3 is an enlarged partial vertical cross-section view of the alignment apparatus taken along the line III—III of FIG. 1, and looking in the direction of the arrows.

Referring particularly to FIG. 3, the flap 23 comprises a flat release surface 24 which faces the upper surface 12 and a non-release surface which is permanently attached to shield 20. The release surface 24 forms a pocket between the upper surface 12 and shield 20 into which the joining strip 40 can be inserted to allow loading the strip 40 under both flaps 23 and 21. The opposed flap 21 is joined to the other side of shield 20 in a similar but complementary opposed orientation. Shield 20 is permanently attached to surface 12 by means such as pressure sensitive adhesive.

Referring particularly to FIGS. 1,3,6,8 and 11, the edges of the flaps 21 and 23 are bent upwards to aid in inserting the joining strip 40 under the flaps and to provide a slight upwards spring pressure to keep pictures 50 and 60 from touching the adhesive strips 43 and 44 during the alignment procedure.

Figure 11:
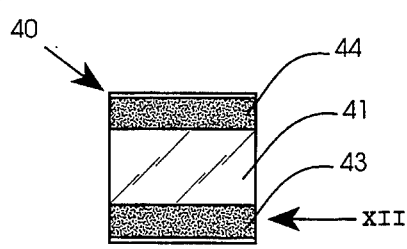
FIG. 11 is a top plan view of a connector strip embodying the principles of the present invention.
Figure 12:
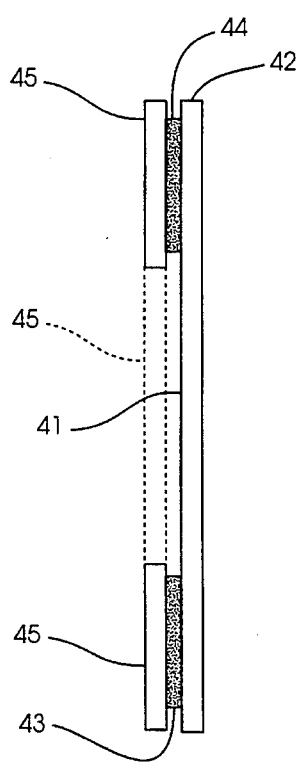
FIG. 12 is an enlarged side elevation view of a connector strip looking in the direction of arrow XII of FIG. 11, embodying the principles of the present invention.

Referring particularly to FIGS. 11 and 12, the joining strip 40 comprises a thin flat supporting substrate 42 with a planar surface 41 which contains two distinctly separated areas of pressure sensitive adhesive 43 and 44. It is preferable for the substrate to be of a material such as polyester sheeting that will resist distortion due to time or handling. It is also preferable for the substrate to be transparent or of the same color as the display surface so that it is essentially invisible. The pressure sensitive adhesive 43 and 44 may be covered by one or two separate sheets of release material 45 for protecting the adhesive when in storage. The protective sheet 45 must be removed before capturing the joining strip 40 to the rest of the aligning apparatus 10.

Referring particularly to FIGS. 1,3,6,8 and 11, the joining strip 40 is captured to the surface 12 with the adhesive side 41 of joining strip 40 facing away from surface 12 and towards the release surfaces of flaps 21 and 23, the release surfaces of flaps 21 and 23 being non-adhering to the pressure sensitive adhesive strips 43 and 44.

Figure 2:
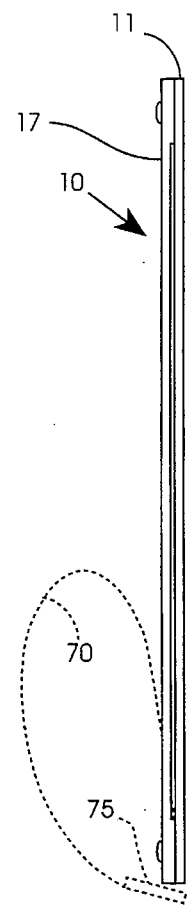
FIG. 2 is a side elevation view of the alignment apparatus with the alignment sheet in the inactive position looking in the direction of arrow II of FIG. 1.

Referring particularly to FIGS. 1,2,3,6 and 8, the flat, flexible, transparent alignment sheet 70 is permanently attached to surface 12 at one first end approximately at the position of guide board 76. The opposite second end is not attached to surface 12 so that the second end is freely extending from the surface 12 and can pivot from the attached opposite edge. Alignment sheet 70 is made of a light weight, dimensionally stable, flexible material such as 4 mil polyester sheeting. Finger tab 75 is permanently attached to alignment sheet 70 by means such as a pressure sensitive adhesive. Finger tab 75 acts as a convenient handle for the operator to manipulate alignment sheet 70 between an active position and an inactive position as shown in FIG. 2 by dashed lines. Finger tab 75 is made of a material sufficient in weight such that it serves to hold alignment sheet 70 to surface 12 in the active position and to hold alignment sheet 70 spaced away from surface 12 in the inactive position as shown in FIG. 2. The inactive position of alignment sheet 70 is used when capturing joining strip 40 into the alignment apparatus 10, and when placing a pair of stereoscopic pictures 50 and 60 on supporting surface 12, and when removing a pair of stereoscopic pictures 50 and 60 joined together by joining strip 40. When alignment sheet 70 is in the active position it will be resting partially on top of the pair of stereoscopic pictures 50 and 60 and partially on supporting surface 12 such that the stereoscopic pictures 50 and 60 are sandwiched between supporting surface 12 and alignment sheet 70.

The method of capturing the joining strip 40 is to orient the alignment apparatus in front of the operator as in FIG. 1, using finger tab 75, pull alignment sheet 70 away from the surface 12 and towards the operator to the inactive position which will be maintained due to the weight of the finger tab 75, remove release paper 45 from the adhesive surface 43 and 44, with the adhesive surface 41 facing up insert one side under flap 21 until the other side of strip 40 clears flap 23, and reverse the direction of movement of strip 40 so that it is inserted under flap 23 and equally centered between flaps 21 and 23.

Referring particularly to FIGS. 1, 6, 7, 8, 9 and 11, alignment sheet 70 has cut out areas 71, 72, 73 and 74 which are used to expose a portion of the stereoscopic pictures 50 and 60 so that they can be manipulated digitally by the operator relative to each other and relative to the grid markings on alignment sheet 70. Cut out areas 73 and 74 allow access to two top corners of picture 50. Cut out areas 71 and 72 allow access to two top corners of picture 60 while at the same time restricting access from the vicinity of the pressure sensitive adhesive strips 43 and 44. The best way to manipulate picture 60 is to lightly rest one finger of the operators left hand onto the face 61 of picture 60 through cut out 71 and to lightly rest one finger of the operators right hand onto picture 60 through cut out 72. The operator then uses only as much downward force through the fingers onto picture 60 as is required to create sufficient friction for picture 60 to follow the adjusting movements of the fingers. Rotational adjustments around a center point located on picture 60 are easily accomplished by lifting one of the operators fingers away from picture 60 and pressing it lightly onto the alignment sheet 70 at the center of desired rotation on picture 60. In a similar way, picture 50 can be manipulated by the operator through cut out areas 71 and 72.

Figure 7:
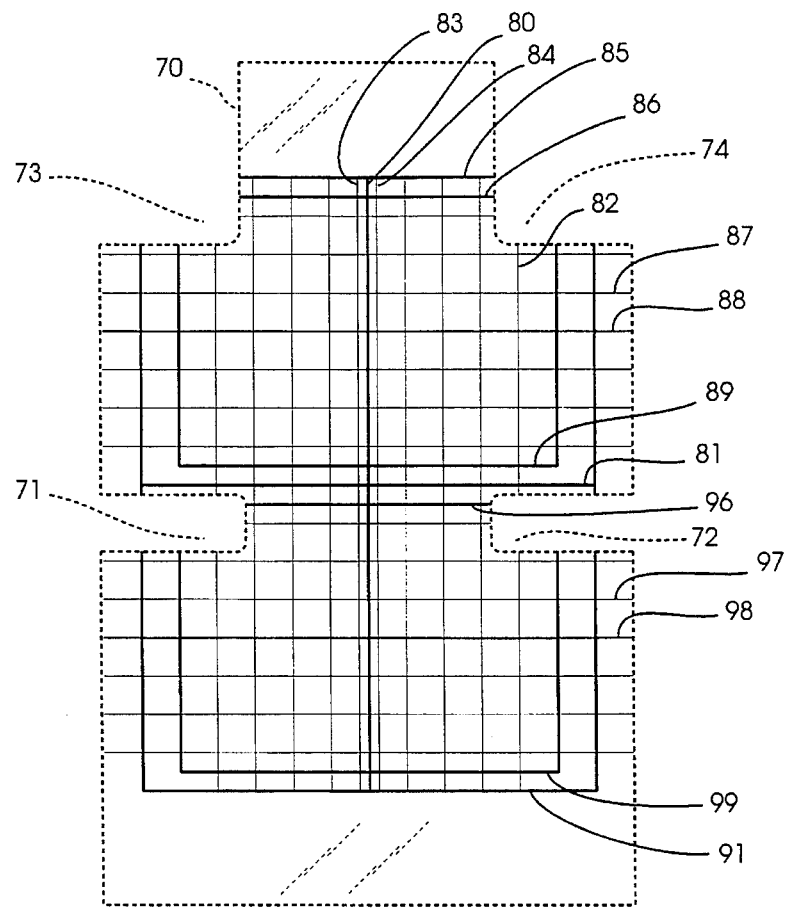
FIG. 7 is a top plan view detail of transparent alignment sheet 70 of FIG. 1 with grid markings embodying the principles of the present invention.
Figure 8:
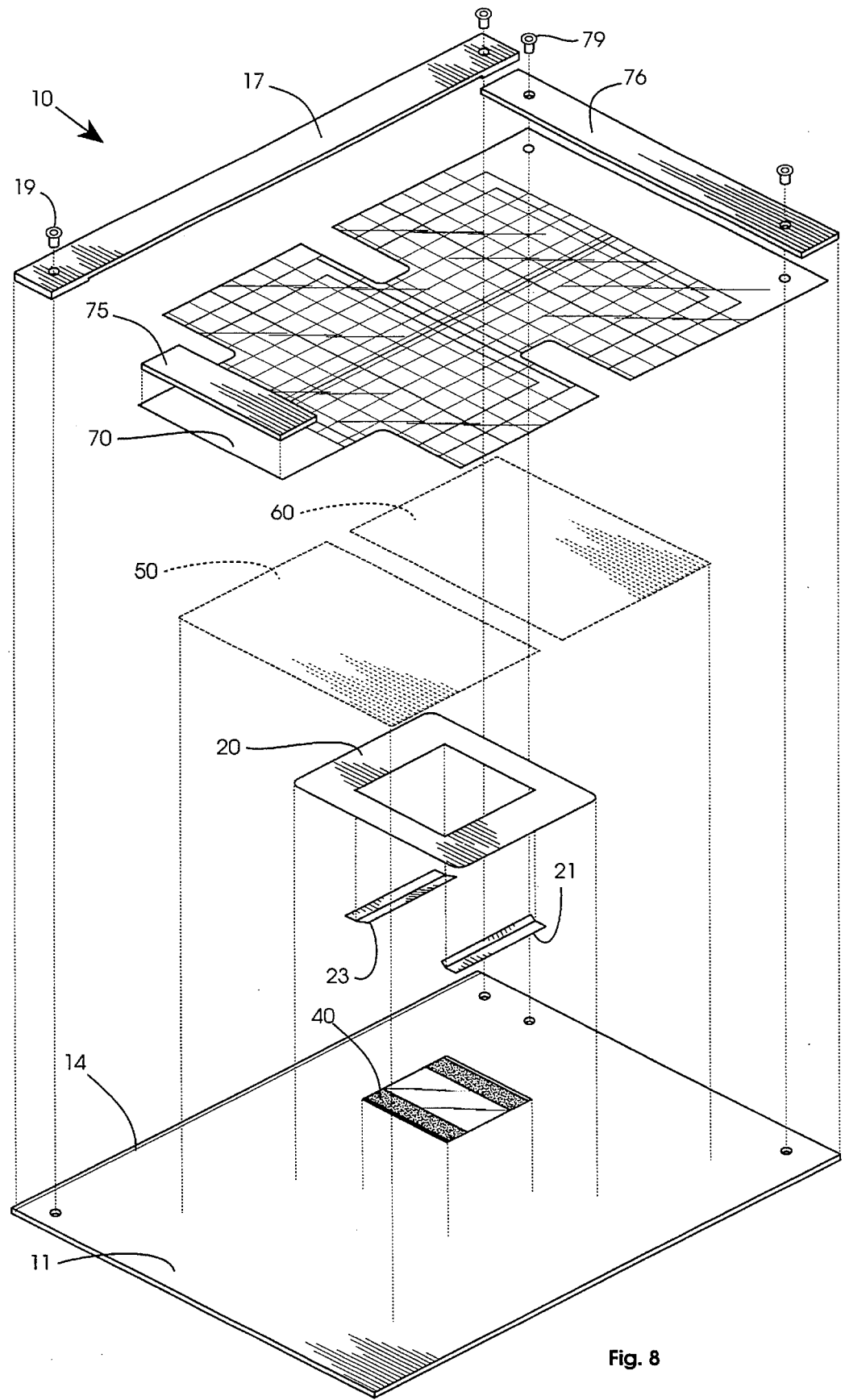
FIG. 8 is a vertically exploded view of FIG. 6 incorporating the grid markings of FIG. 7, FIG. 9 a top plan view of a stereoscopically complementary pair of pictures held in permanent alignment by a connector strip embodying the principles of the present invention.

Referring particularly to FIGS. 7 and 8, alignment sheet 70 has grid markings to aid the operator in the alignment process. There are two sets of markings which are substantially the same, the first markings corresponding to the first picture 50 and the second markings corresponding to the second picture 60. The first set of markings comprise the area between horizontal lines 81 and 85. The second set of markings comprise the area between horizontal lines 91 and 81.

Horizontal line 88 represents a distinct center position for the first set of markings. Horizontal line 98 represents a distinct center position for the second set of markings. A series of generic horizontal line pairs represented by lines 87 and 97 are evenly distributed across the entire area of the two sets of markings. The vertical spacing between lines 88 and 98 and all other horizontal line pairs correspond to the optimum spacing between the images located on the surface of pictures 50 and 60 for optimum viewing through a particular stereoscope. All horizontal line pairs are used by the operator as an aid in adjusting the pictures 50 and 60 relative to each other so that the images that appear on the surfaces 51 and 61 of the pictures 50 and 60 are spaced for optimum viewing. By having many line pairs available over the surfaces 51 and 61, many vertical reference points can be compared quickly. This is a distinct advantage not only for speed of alignment, but also because some undesirable vertical size variations or distortions may appear in the pictures caused by camera operator error or differences in camera tolerances or differences in print processing equipment tolerances. These distortions are best minimized by averaging out the differences across the entire image, which is facilitated by having many vertical reference points. Two sets of rectangular outline markings are provided which correspond to the ideal position of two popular print sizes one of which is larger than the other in all dimensions. All of the rectangles have missing top corners due to the cut out areas 71, 72, 73 and 74. In the first set of markings, the larger print size is defined by distinctive lines 81 and 85, while the smaller print size is defined by distinctive lines 89 and 86. In the second set of markings, the larger print size is defined by distinctive lines 91 and 81, while the smaller print size is defined by distinctive lines 99 and 96. Line 81 serves as both a top and a bottom line of two rectangles, because two of the rectangles and the two sets of markings abut each other at line 81.

Figure 9:
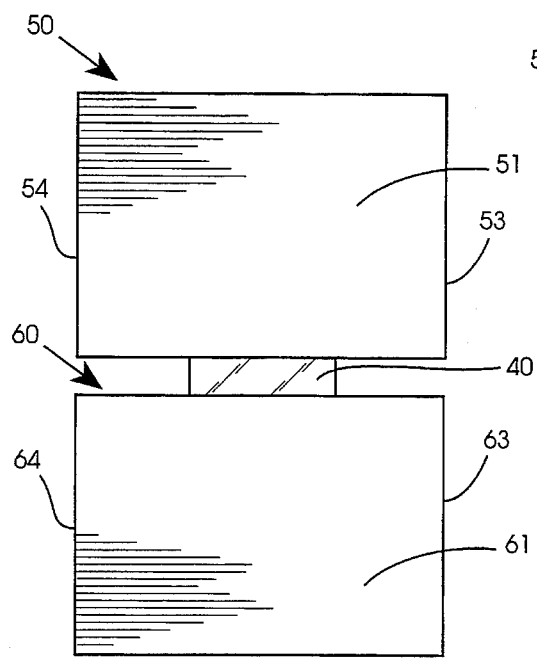
Figure 10:
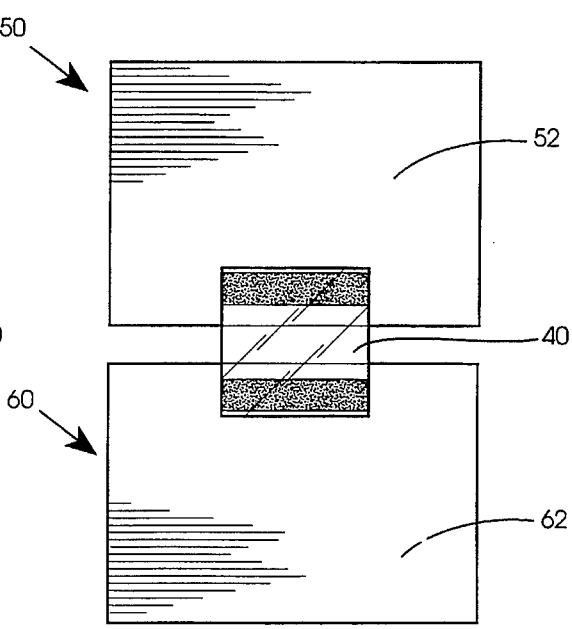
FIG. 10 is a rear plan view of a stereoscopically complementary pair of pictures held in permanent alignment by a connector strip embodying the principles of the present invention.

Referring particularly to FIGS. 1, 7 and 9, vertical line 80 represents a distinct vertical center line for both sets of markings. A series of generic vertical lines represented by line 82 are evenly distributed across the entire area of the two sets of markings. These vertical lines are aligned in both sets of markings so that they appear as a single vertical line extending all the way through both sets of markings. These vertical lines are spaced horizontally substantially wider than the expected maximum horizontal image shift expected in a pair of properly exposed stereoscopic pictures. These vertical lines are used by an operator as an aid in setting the position of the stereo window. When viewed through a stereoscope, these vertical lines will provide a reference grid that resides in a depth plane that corresponds to the edge of the physical pictures 50 and 60, if the physical vertical edges 53 and 63, and 54 and 64 of pictures 50 and 60 are in alignment as shown in FIG. 9. By viewing both prints 50 and 60 through the alignment grid 70 with a stereoscope, the operator will see all the objects in three dimensions including the reference grid. By adjusting print 60 left or right relative to print 50, the operator will see the reference grid move in depth relative to the rest of the objects in the picture. The operator can then adjust for the stereo window effect that will provide the most pleasing effect. Two vertical lines 83 and 84 on either side of distinctive vertical line 80 are used by the operator to more easily detect the center line 80. If the operator adjusts print 60 left or right relative to print 50 by an excessive amount, the reference grid will give a false indication of the true stereo window depth plane. If this erroneous condition should occur, the operator will observe what appears to be two of center line 80 on adjacent vertical lines in the reference grid.

Referring particularly to FIGS. 1, 3, 6, 9, 10 and 11, once the operator has completed the adjustments of pictures 50 and 60 relative to each other so that they are in proper alignment for viewing, the operator applies a downward pressure with his palm onto the top and center area of the alignment sheet 70, in the vicinity of the captured joining strip 40, so that the alignment sheet 70 is forced against the pictures 50 and 60, which in turn are forced against the joining strip 40, engaging the pressure sensitive adhesive strip 43 to picture 60 and adhesive strip 44 to picture 50. To remove the coupled pictures 50 and 60 and joining strip 40 from the alignment apparatus 10, first the alignment sheet 70 is moved to its inactive position. The coupled pictures 50 and 60 and joining strip 40 are now captured to the alignment apparatus 10 only by the pair of opposed flaps 21 and 23. However, flaps 21 and 23 are flexible and non stick to the adhesive strips 43 and 44. A gentle upward tug by the operator is all that it takes to remove the coupled pictures 50 and 60 and joining strip 40 from the alignment apparatus 10. The alignment sheet 70 is then moved back to its active position.

Figure 4:
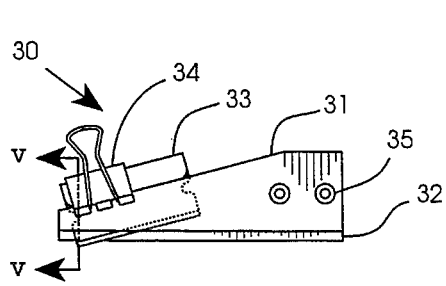
FIG. 4 is a side elevation view of a cutting blade holder embodying the principles of the present invention.
Figure 5:
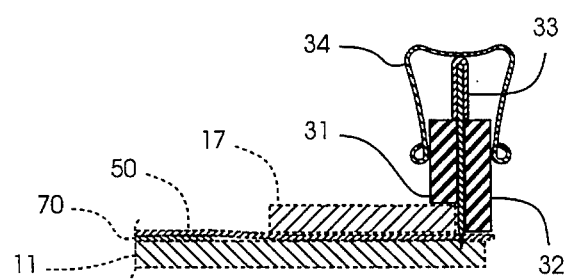
FIG. 5 is an enlarged vertical cross-section view of the cutting blade holder taken along the line V—V of FIG. 4 and looking in the direction of the arrows and superimposed over a partial vertical cross-section view of the alignment apparatus taken along the line III—III of FIG. 1, and looking in the direction of the arrows.
Figure 6:
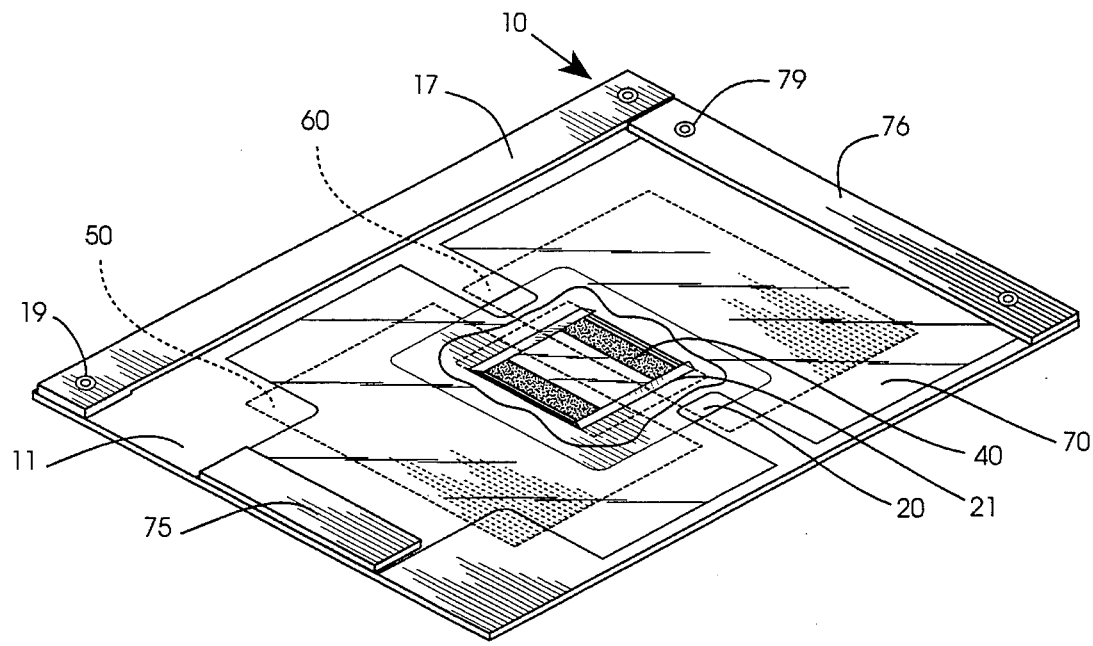
FIG. 6 is a top, rear, left perspective view of the apparatus looking in the direction of arrow VI of FIG. 1.

Referring particularly to FIGS. 1, 2, 3, 4, 5, 6 and 8, a guide strip 17 is fixed to surface 12 at two points spaced apart at either end of guide strip 17 by means such as rivets 19. The outer edge of guide strip 17 is spaced back from the outer edge of the supporting base 11 so that it is in line with a blade groove 14 which is cut through surface 12 and into supporting base 11 and runs the entire length of the supporting base 11 and spaced back from the outer edge of supporting base 11 to form a cutting base 13 for an edged cutting blade 33. Most of guide strip 17 is spaced away from surface 12 to form a slot 18 high enough to allow a picture 50 in FIG. 5 to be slid through slot 18. Guide strip 17 is also sufficiently flexible to allow a downward pressure applied to its top surface by the operator to clamp the picture 50 to surface 12 and immobilize the picture 50 for trimming as shown in FIG. 5. A guide board 76 is fixed directly to alignment sheet 70 and indirectly fixed to surface 12 by means such as rivets 79, adjacent to an outer edge of supporting base 11 and the inner edge of guide board 76 aligned at a right angle to the outer edge of guide strip 17. A picture resting on top of alignment sheet 70 with one edge aligned to the inner edge of the guide board 76 and partially extending through slot 18 can have the portion of the picture extending through slot 18 trimmed by an edged blade 33 at a right angle to the picture edge which is aligned to the inner edge of the guide board 76.

Referring particularly to FIGS. 4 and 5, a blade holding apparatus 30 is shown which enables an operator to more safely handle a single edged cutting blade and more easily guide the blade for a straight cut when used with guide strip 17 and blade groove 14 of alignment apparatus 10. Blade holding apparatus 30 comprises a first supporting plate 31 which is fixed to a second supporting plate 32 at one end by means such as rivets 35. The bottom edge of supporting plate 31 is spaced away from the bottom edge of supporting plate 32 by a distance equal or slightly less than the thickness of guide strip 17. A single edged cutting blade 33 is inserted between supporting plates 31 and 32 and slid along one angled edge of supporting plates 31 and 32 until the tip of the blade 33 extends beyond the bottom edge of supporting plate 32 by an amount equal to the depth of blade groove 14. The edged cutting blade 33 is secured by a spring steel binder clip 34 which also acts as an operator finger rest and guard.

The operator makes the final operation to the joined picture pair shown in FIG. 9 by trimming the edges 53 and 63 and edges 54 and 64 in line and parallel to each other. This trimming operation will set the stereo window to the position selected by the operator in the alignment procedure. The best way to use this trimming capability of the apparatus is to place the coupled pair of pictures 50 and 60 on top of the alignment sheet 70 with the joining strip 40 facing the alignment sheet 70, and the bottom edge of picture 60 against guide board 76. The operator then slides the pictures to the right and through slot 18 until a small amount of edge 53 and 63 can be seen protruding past the outer edge of guide strip 17. The operator's left hand is then used to hold the pictures firmly in place and pressure is applied to the top of guide strip 17. The operator's right hand holds the blade holder 30 with the index finger resting on top of spring clip 34. The operator then engages the cutting blade 33 into the blade groove 14 and supporting plates 31 and 32 against two edges of the far end of guide strip 17 as shown in FIG. 5. With a light downward and leftward pressure on the blade holder 30, the operator draws the blade 33 towards the operator along the guide strip 17 and groove 14 which severs any portion of the pictures that are to the right of the blade. The pictures are then removed from slot 18 and turned over so that the joining strip 40 is now facing away from the alignment sheet 70, and the same bottom edge of picture 60 is against guide board 76. The operator next performs the same trimming sequence again with the pictures to trim edges 54 and 64. The pictures are now ready for attachment to a display surface or album or viewed as is with an appropriate stereoscope.

Clearly, changes may be made in the form and construction or method of use of the invention without departing from the material spirit thereof. It is not, however, desired to confine the invention to the exact forms herein shown and described, but it is desired to include all such as properly come within the scope claimed.

The invention having been thus described, what is claimed as new and desire to secure by Letters Patent is:

1. A complementary pair of stereoscopic pictures to aligning and coupling apparatus be used with a stereoscopic device, said apparatus comprising:
   (a) a base having a flat upper supporting surface for supporting a pair of complementary stereoscopic pictures;
   (b) a flat transparent alignment sheet which is mounted on said base for movement between an active position wherein the sheet rests on said flat upper supporting surface and an inactive position wherein said sheet is spaced sufficiently from said flat upper supporting surface to enable a pair of pictures to be placed on said supporting surface so that said pair of pictures which is placed on said flat supper supporting surface is sandwiched between said supporting surface and said sheet, said sheet having markings for enabling one of said pair of pictures to be aligned relative to the other of said pair of pictures for optimum viewing by a stereoscopic viewing device; and
   (c) coupling means positioned between said flat upper supporting surface and said sheet for fixing one of said pair of pictures to the other of said pair of pictures.

2. An apparatus as recited in claim 1, wherein said alignment sheet comprises:
   (a) a first portion which has first markings;
   (b) a second portion which has second markings which are complementary to said first markings; and
   (c) a third portion which is located between said first and second portions and which connects said first portion to said second portion, said third portion being substantially narrower than each of said first and second portions and substantially narrower than the pictures which are to be aligned and coupled so that at least a portion of each picture of said pair of pictures will not be covered by said alignment sheet to enable each of said pair of pictures to be digitally manipulated for alignment of said pair of pictures relative to each other.

3. An apparatus as recited in claim 1, wherein said transparent sheet has at least one cut out area so that a portion of at least one of said pair of pictures is exposed and can be digitally manipulated relative to the other of said pair of pictures.

4. An apparatus as recited in claim 1, wherein said transparent sheet has a first end which is pivotally connected to the upper supporting surface of said base and a second freely extending end.

5. An apparatus as recited in claim 4, wherein said apparatus further comprises a finger tab which is operatively connected to the free end of said flexible sheet.

6. An apparatus as recited in claim 1, wherein said base has a guide strip which is fixed to said supporting surface at two spaced fixed points and at least a portion of said strip between said fixed points is spaced from said upper supporting surface to enable a picture to be inserted between said strip and said supporting surface so that a portion of said picture extends beyond said strip for enabling the portion of said picture which extends beyond said strip to be severed from said picture.

7. An apparatus as recited in claim 6, wherein said guide strip has an inner guide edge which faces said flexible sheet and an outer guide edge which faces away from said flexible sheet, and wherein said supporting surface extends beyond said outer guide edge to serve as a cutting base for an edged cutting blade.

8. An apparatus as recited in claim 7, wherein said apparatus further comprises a knife for trimming said picture on said base, said knife comprising:

(a) a body which is slidably mounted on said outer guide edge and which enables the knife to be grasped by a user's hand, said body having a notch for engaging said outer guide edge to enable said knife to be moved along said outer guide edge for trimming the picture; and (b) a cutting blade which is fixed to said body so that said blade engages the portion of said supporting surface which extends beyond said outer guide when said notch is in engagement with said outer guide edge.

9. An apparatus as recited in claim 8, wherein the portion of said supporting surface which extends beyond said outer guide has a groove and said blade extends into said groove when said notch is in engagement with said outer guide edge.

10. An apparatus as recited in claim 1, wherein said coupling means comprises:

(a) a planar shield which is fixed to said supporting surface, said shield having an opening, said opening being positioned so that when said pair of pictures are aligned with respect to each other, the adjacent edges of both of said pair of pictures are within said opening; and (b) a joining strip which has a planar surface which contains a pressure sensitive adhesive, said joining strip being configured to lie within said opening with said planar surface facing said flexible sheet so that said pictures are supported on said shield for manipulation of said pictures to align said pictures with respect to each other, said planar surface engaging said pictures upon application of downward pressure on said flexible sheet and pictures above said opening for attaching said strip to said pictures and joining said pictures.

11. An apparatus as recited in claim 10, wherein said shield has a pair of opposed flaps which face said opening, each of said flaps being fixed to said shield and free of said supporting surface for enabling the ends of said joining strip to be positioned under said flaps.

12. An apparatus as recited in claim 11, wherein each of said flaps has a flat release surface which faces said supporting surface, said release surface being non-adhering to the pressure sensitive adhesive of said joining strip.

13. An apparatus as recited in claim 10, wherein the planar surface of said joining strip contains a first layer of said pressure sensitive adhesive which is parallel to and spaced from said first layer of pressure sensitive adhesive to enable said first layer to adhere to one of said pair of pictures and said second layer to adhere to the other of said pair of pictures and to enable said pictures to be spaced from each other so that the space between said pictures is occupied by a portion of said planar surface which is between said first and second layers of pressure sensitive adhesive.

14. An apparatus as recited in claim 1, wherein said joining strip further comprises at least one removable sheet of release material for protecting said first and second layers of pressure sensitive adhesive.

15. An apparatus as recited in claim 13, wherein joining strip is transparent.

* * * * *